United States Patent [19]
Chess et al.

[11] 3,711,231
[45] Jan. 16, 1973

[54] URETHANE TUNNEL MOLD

[75] Inventors: Samuel Chess; Lawrence C. Porter, both of Palos Verdes, Calif.

[73] Assignee: The Upjohn Company, Kalamazoo, Mich.

[22] Filed: Oct. 30, 1970

[21] Appl. No.: 85,640

[52] U.S. Cl. .....................425/127, 425/4, 425/227
[51] Int. Cl. ............................................B29d 27/04
[58] Field of Search ..............18/4 B, 5 A, 12 F, 12 S; 425/4, 127, 224

[56] References Cited

UNITED STATES PATENTS

| | | | |
|---|---|---|---|
| 3,496,596 | 2/1970 | Buff | 18/4 B |
| 3,383,441 | 5/1968 | Norrhede et al. | 18/4 B X |
| 3,123,856 | 3/1964 | Dye et al. | 18/4 B |
| 3,152,361 | 10/1964 | Edwards | 18/4 B |
| 2,779,053 | 1/1957 | Longstreth et al. | 18/14 S UX |

Primary Examiner—H. A. Kilby, Jr.
Attorney—Fidler & Bard

[57] ABSTRACT

The disclosure relates to apparatus for use in production of elongated elements of foamed cellular material from a liquid reaction mixture by a continuous process where the mold is comprised of a tunnel or channel having a given curvilinear cross-sectional configuration. Endless belt conveyor means encircle the channel and are in side-by-side guided relationship. The width of the belts is functionally related to the degree of curvature. Means are provided for guiding the belts lengthwise through the tunnel.

12 Claims, 12 Drawing Figures

Samuel Chess
Lawrence C. Porter
INVENTORS

BY FIDLER & BARD

ATTORNEYS

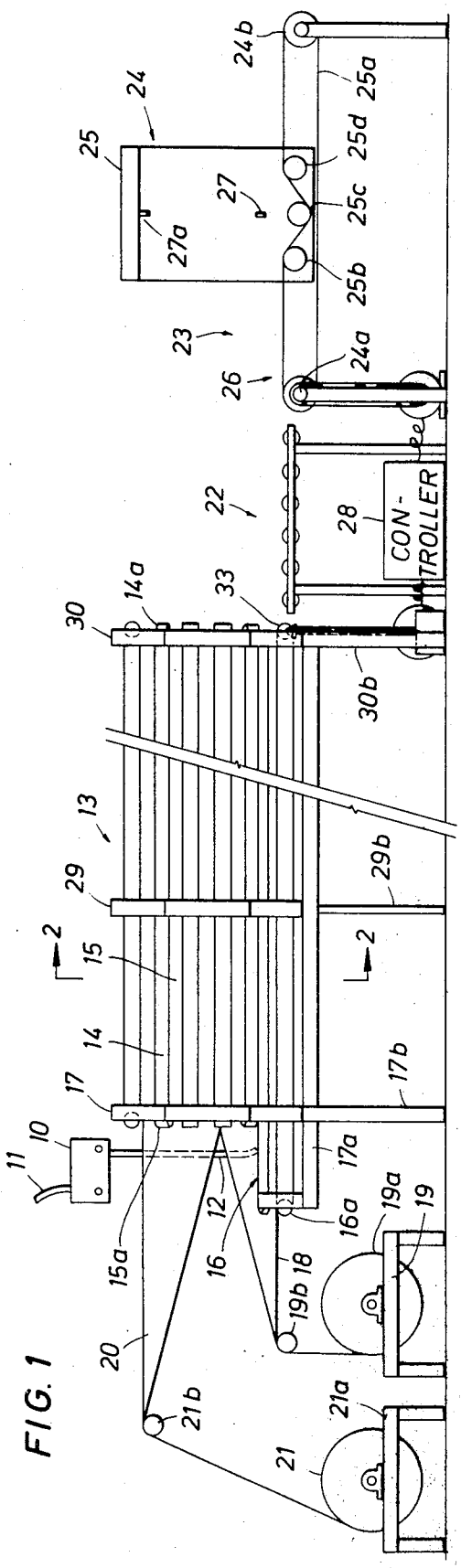
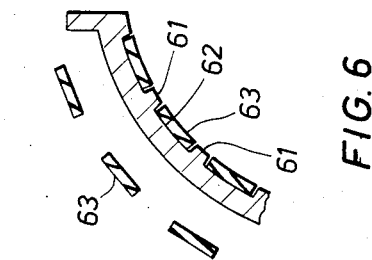
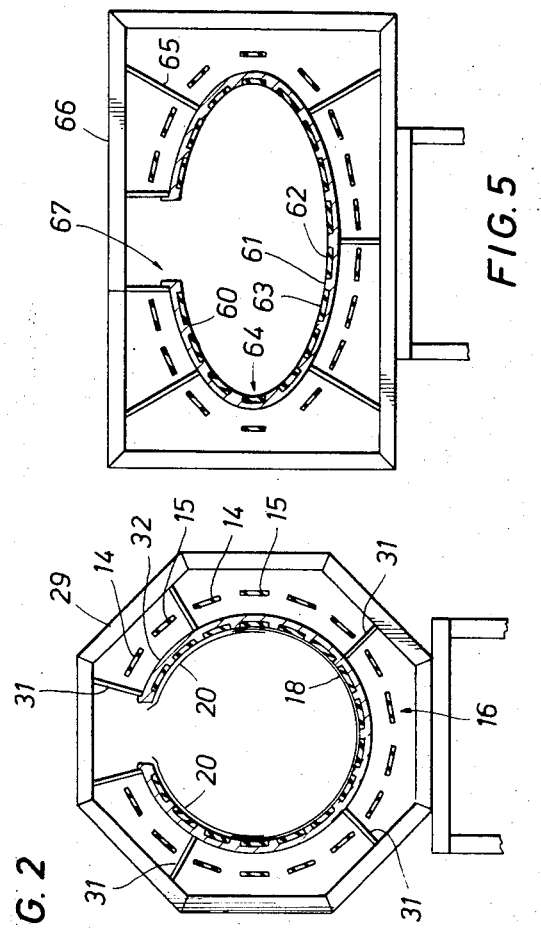
Samuel Chess
Lawrence C. Porter
INVENTORS
BY FIDLER & BARD
ATTORNEYS

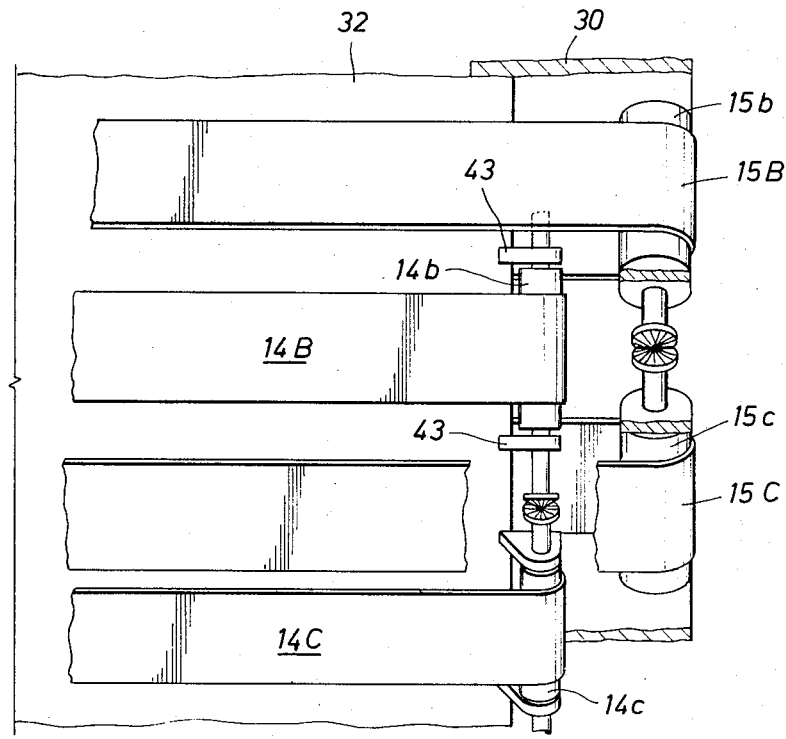
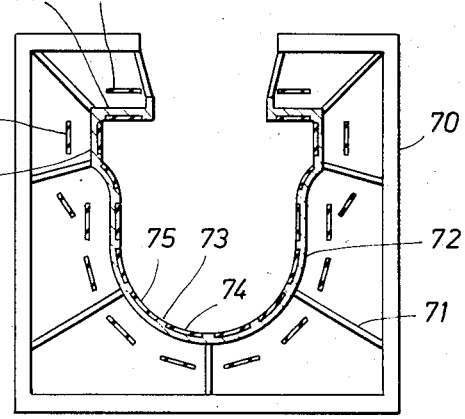
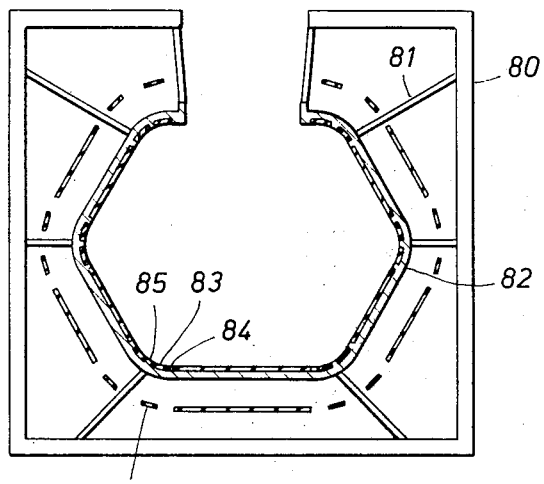

Samuel Chess
Lawrence C. Porter
INVENTORS

BY   FIDLER & BARD

ATTORNEYS

URETHANE TUNNEL MOLD

This invention relates to continuous molding operations and, more particularly, to a tunnel mold for forming elongated elements of foamed cellular material with a cross-section which has a curvature.

Prior art technology for forming foamed articles with an outer curvature have been heretofore confined to the formation of cylindrically shaped products. To form the products, the general practice has been to pour a liquid reaction mixture at a pouring station onto a moving endless conveyor. The mixture reacts and sets in its expanded state as it is moved away from the pouring station. The cylindrical shape of the product is defined by die inserts carried by movable side conveyors. The contoured die inserts thus are movable with the foam on the conveyors until the product assumes its final self-sustaining shape. Examples of this technology are found, for example, in U. S. Pat. Nos. 3,496,596, 3,476,845 and 3,296,658.

As will be readily appreciated, the conveyors with die inserts are complex since they involve articulated, bulky units and are difficult to drive in synchronism with the expansion of the foam. In addition, the die elements are not porous, as belt webbing, and therefore fail to permit escape of gases created during the reaction.

The liquid reaction mixture to produce a polyurethane foam typically consists of a suitable polyhydroxyl compound, a blowing agent such as Freon, and a polyisocyanate. The mixture begins a chemical reaction when the above components are mixed. From the point of deposit on the conveyor, the mixture begins to expand and, at a further point of travel, transforms from a liquid to a solid. It is the function of the mold to define the expanded configuration. The expanded solidified foam can be either a rigid or resilient cellular structure, depending upon the choice of resin.

As the completed product is carried out of the exit end of the tunnel, it may be cut into preselected lengths or billets. These billets are cut to shapes as may be desired by fabricators. An object, of course, of contouring the shape of the product is to eliminate waste where cylindrically shaped products are desired.

In addition to the basic foam constituents hereinbefore mentioned, it has been found desirable to include certain other materials in the mixture to produce a polyurethane foam having ideal properties. For example a surfactant such as polyoxalkylene-polydimethylsiloxane ("Silicone") is usually included in selected amounts to regulate cell size and cell wall stability during foaming. Water can be included in regulated amounts to give a degree of "flowability" during the "rise" stage so that the expanding foam will fill the tunnel. Catalysts such as triethylamine and organo tins are also usually included in proper proportions to achieve a desirable balance between the foaming and polymerization reactions and to control the speed of the reaction.

The present invention is directed to novel means for supplying a liquid reaction mixture to a continuous molding apparatus at the upstream end of a molding channel. The molding channel is curvilinear and includes segmented, endless belts which are sized relative to the degree of curvature of the channel and provide a continuous conveyor through the channel. Paper is supplied for lining the moving conveyor surfaces of the channel. To handle sharp degrees of curvature, smaller belt widths are used, and guide means are provided lengthwise of the channel to maintain the belts in alignment.

Various other and more specific objects, features and advantages of the invention will appear from the description given below, taken in connection with the accompanying drawings illustrating, by way of example, the preferred form of the invention.

In the drawings:

FIG. 1 is a plan view of a molding apparatus embodying the principles of the present invention.

FIG. 2 is a partial sectional view taken along line 2—2 of FIG. 1.

FIG. 4 is a partial plan view of the embodiment of FIG. 3 taken along line 4—4 of FIG. 3.

FIG. 5 is a cross-sectional view of another embodiment of the present invention.

FIG. 6 is an enlarged view taken from FIG. 5 of a portion of that embodiment.

FIGS. 7 and 8 illustrate in cross-section diagrammatically other configurations of the present invention.

Figure 3:
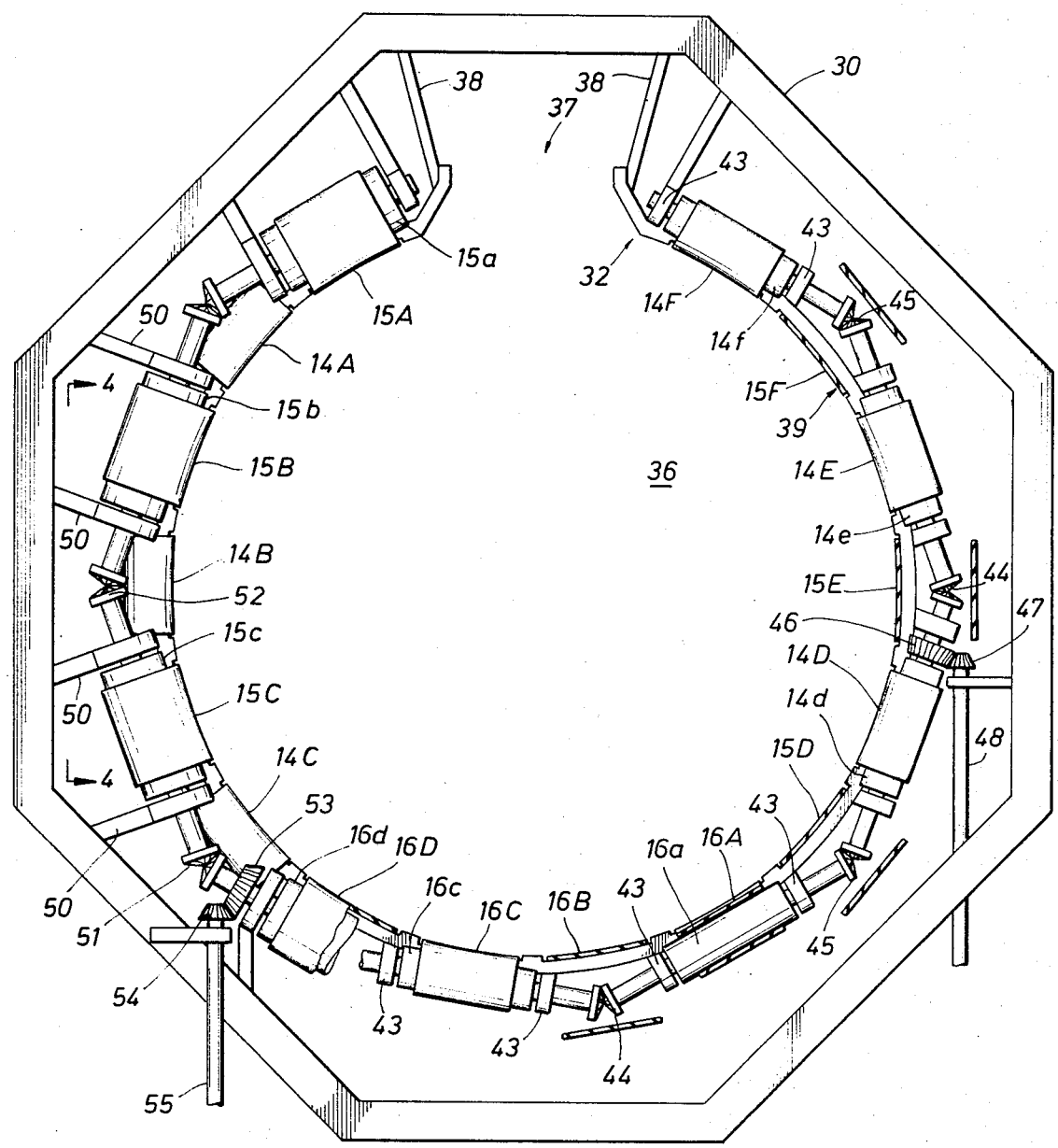
FIG. 3 is a cross-sectional view of an alternative embodiment of the present invention.

The molding apparatus shown in FIGS. 1 and 2 is for the purpose of producing large diameter, cylindrically shaped blocks of cellular polyurethane from a liquid reaction mixture. The components for the liquid reaction mixture are supplied to a conventional mixing head 10 through one or more conduits 11 (see U.S. Pat. No. 3,482,822). In the mixing head, the components are thoroughly mixed and discharged via an outlet 12 onto a bottom, segmented portion of moving conveyor segments 16 of the tunnel mold 13. The tunnel mold 13 also has a number of endless side and upper belts extending around its periphery, which belts are alternately numbered 14 and 15. The bottom or lower belts 16 which extend outwardly from an end frame 17 of the tunnel provide a deposit location for the reactive mixture. Bottom separation paper 18 (or any other suitable barrier film) is supplied from a roll 19a of paper, and the paper 18 extends generally for 180° of the cylindrical shape by well-known creasing means (not shown). The paper roll 19a is mounted on a frame 19 and passes over a pulley 19b. Side separation papers 20 (only one being shown) are supplied from rolls of paper 21 to cover the upper halves of the cylindrical foam product and provide a spacing therebetween for the mixing nozzle, as shown in FIG. 2. The paper roll 21 is mounted on a suitable frame 21a and passes over a pulley 21b. The cylindrical form is obtained by conventional roll means (not shown). In the operation of the apparatus, the paper is manually located in the tunnel mold and becomes self-feeding when the reaction mixture provides sufficient body to engage the paper functionally with respect to the travelling belts 14–16.

Belts 14–16, as will hereinafter be more fully explained, are driven at a surface speed which is related to the throughput volume of the mixer 10, the size of the tunnel and its inclination. The belts, however, provide the conveyor for carrying the liquid reaction mixture continuously through the tunnel 13. During travel through the tunnel, the mixture undergoes a series of reactions, wherein it foams, expands and solidifies in a form whose cross-sectional configuration is defined by the molding channel 13. After solidification, it exits from the rear portion of the tunnel 13 onto a intermediary roller conveyor 22 and is conveyed by the intermediary conveyor 22 to a belt conveyor 23 carrying a traveling saw 24. The traveling saw 24 has a carriage 25 arranged to travel from the front end 26 of the assembly at the same speed as the product is carried and, while so moving, a saw 27 is moved transversely through the product to slice it into a section. The expanded product will continuously exit from the tunnel irrespective of the action of the saw 29.

Accordingly, the saw 24 starts at the front end 26 of the assembly with the blade 27 in an uppermost position 27a in the carriage 25. An endless belt 25a is supported by pulleys 24a and 24b, and carriage 25 has three rollers 25b, 25c and 25d with the belt 25a being arranged to pass over rollers 25b and 25d and under roller 25c. Roller 25c is aligned with saw blade 27 and disposed below the upper level of belt 25a so that the blade 27 can cut through the product without affecting belt 25a. Rollers 25b–d, of course, drive carriage 25 from the front end 26 toward the rear pulley 24b. During this traverse the saw 27 (which can be a band saw) is moved downwardly through the product until it is severed. A limit switch then reverses the travel of the saw returning it to its initial position, whereupon another switch disengages rollers 25b–d and carriage 25 is returned to the front end by a fast traverse to repeat the sawing operation. The above described functions of the structure are performed by conventional mechanisms well known to the art. The speeds of the saw 24 and the intermediate conveyor 22, as well as the tunnel conveyor, are controlled by a controller 28 and driven synchronously with respect to one another by means of conventional drive systems. While not illustrated, it is desirable to elevate the front end of the conveyor so that it tilts in a downward direction. This assists in maintaining a flat foam front by adjusting the flow of liquid to the expansion caused by the reaction. In addition, the creased paper forms a trough so that the mixture will flow away from the mixing head, thereby preventing back-flow.

As shown in FIG. 1, the tunnel 13 has an end support 17, one or more intermediate supports 29 and another end support 30. A forward extension 17a is provided for supporting the lower belts which receive the reactive mixture. Base supports 17b, 29b and 30b support the tunnel 13.

As shown in FIG. 2, the intermediate supports 29 have a plurality of radial web sections 31 which are attached to a cylindrically shaped back-up plate 32. Back-up plate 32 effectively defines the contour of the tunnel. Each of the belts 14–16 is supported on pulleys 14a–16 and driven in synchronism by the controller 28 through a drive mechanism 33.

In accordance with the present invention, the belts 14–16 are in a side-by-side relationship to provide a nearly continuous surface. The width of the belts is related to the degree of curvature of the supporting member so that the belt is not unduly curved. That is, the greater the degree of curvature, the smaller the belt width. In the embodiment illustrated the belts are preferably no greater in width than a 15° angle. By increasing the number of belts, the thickness of the belts can be decreased. Preferably, the belts are received in guide recesses in the back-up plate 32.

While belts are shown extending around the periphery of the circular cross-section in FIGS. 1 and 2, it is not necessary to do so, and the belts may extend for, say, only the lower half of the circular configuration. Where upper belts are used, the effects of gravity can be overcome by use of idler or take-up pulleys (not shown).

In the end frames 17 and 30 and frame extension 17a, pulleys are provided for belts 14–16. The pulleys are commonly driven to obtain uniform surface speed of the belts. As shown in FIGS. 3 and 4, an end frame 30 surrounds a cylindrically shaped tunnel 36. The tunnel has an upper open end 37 to the frame 30. A first group of belts 14(A–F) alternates with a second group of belts 15(A–F) on both sides of bottom belts 16(A–D). The groups of belts respectively are driven by pulleys as illustrated at 14(d–f), 15(a–c) and 16(a, c, d). Pulleys 15(A–F), 16B and 16D are longitudinally displaced relative to pulleys 14(A–F), 16A and 16C. Belts 14–16 are, however, in a side-by-side relationship, and the pulleys are located at the end of tunnel 36. Preferably, there are recesses 39 in the inner surface of plate 32 which provide a guide for each belt. The recesses are equidistantly spaced around the circumference of the plate 32, and the belts are thicker than the depth of the recesses. Adjacent to the end of tunnel 36 the pulleys for belts 14(A–F) are respectively supported on the outer surface of back-up plate 32 by brackets 43. The pulleys for belts 14(A–F) have beveled gears 44 and 45 at opposite ends, which gears intermesh with gears on adjacent pulleys. An additional gear 46 is on the shaft of pulley 14d and meshes with a drive gear 47 on a drive shaft 48. Drive shaft 48 is suitably supported relative to frame 35 and is coupled to a drive source (not shown) which is regulated by controller 28.

The pulleys for belts 15(A–H) are respectively supported relative to the frame 35 by brackets 50. The pulleys for belts 15(A–H) have beveled gears 51 and 52 at opposite ends, which gears intermesh with gears on adjacent pulleys. An additional gear 54 is on the shaft of pulley 16a and meshes with a drive gear 53 on a drive shaft 55. Drive shaft 55 is suitably supported relative to frame 30 and is coupled to a drive source (not shown) which is regulated by controller 28.

As will be appreciated, the belts 14–16 encircle the tunnel, are in a side-by-side relationship and have a width functionally related to the curvature of the tunnel 36. The pulleys for belts 15(A–F), 16B and 16D are larger in diameter than the pulleys for the belts 14(A–F), 16A and 16C to provide room for the smaller pulley shafts and gears 44, 45. Because of the difference in diameters, the respective sets of pulleys are driven at different speeds to provide a matched surface speed for belts 14–16. Means are not shown for this differential speed drive, but such means are obvious to one skilled in the art.

Referring now to FIGS. 5 and 6, a tunnel with an elliptical configuration is disclosed. It will be readily appreciated from this configuration that the degree of curvature of the tunnel is a significant factor when taken in relation to the curvature of the belts. Likewise, as the width of the belts decreases, registry through the length of the tunnel is a problem. In the embodiment of FIGS. 5 and 6, the back-up plate 60 is generally elliptical in cross-section and has a central, upper opening 67. In the plate 60 are alternating offset portions forming raised surfaces 61 and recesses 62. The recesses are sized to receive endless belts 63 which project a short distance above surfaces 61. The width of the recesses varies in accordance with the curvature; that is, at the bottom of the elliptical tunnel the recesses are fairly wide and diminish in width as the recesses approach the sharp curvature point 64 of the elliptical tunnel. The tunnel is supported by rigid webs 65 coupled to a frame 66, and the belts are driven by pulleys (not shown) located at the ends of the tunnel.

FIGS. 7 and 8 illustrate different cross-sectional configurations which may be obtained by use of the present invention. In FIG. 7, it will be noted that a typical frame 70 supports a curvilinear and bell-shaped tunnel plate 72 by means of rigid webs 71. Tunnel plate 72 is formed of alternate raised and lower surfaces 73, 74 forming recesses which are sized to receive belts 75. The recesses are provided along the curved portions of the tunnel 72, while the flat portions 76, 77 are adapted to receive the belts 78 and 79. Pulley means (not shown) are used to drive the belts through conventional drive systems at similar surface speeds.

Referring now to FIG. 8, in this embodiment a six-sided form can be produced. The frame 80 supports the tunnel configuration 82 by means of rigid webs 81. At the points of curvature, recesses 83 formed by longitudinal guides 84 and 85 are sized to receive the narrow width belts 86. As before, pulleys (not shown) which are driven by conventional mechanisms drive the belts at common surface speeds.

As will be appreciated from the foregoing description, narrow width belts are employed to obtain curvature portions on the tunnel mold. This provides the advantage of being able to handle unusual curved forms with a belt system.

Figure 9:
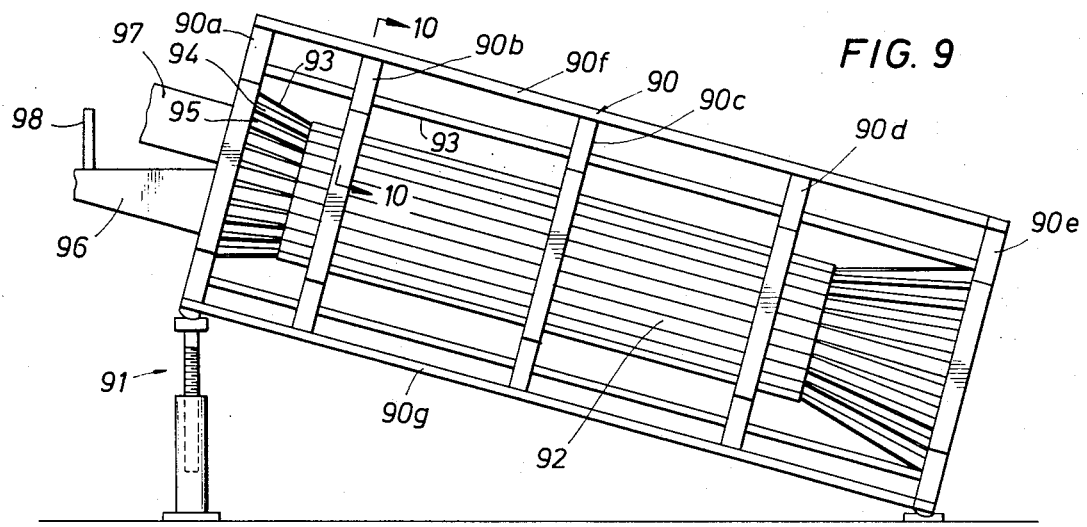
FIG. 9 is a view of an alternative form of the molding apparatus embodying the principles of the present invention.

Turning now to FIG. 9, another form of the present invention is illustrated. In FIG. 9, a frame 90 consists of spaced-apart vertical support sections 90(a–e) coupled by a number of lengthwise extending bars 90f and 90g. The rear end support section 90a is pivotally mounted on conventional height adjusting means 91. An adjustable frame mold 92 is carried by support sections 90b–d) and prevented from longitudinal motion by suitable clamp means or the like. Endless belts 93, 94, 95 are mounted about 320° of the circumference of mold 92. Rollers (not shown) are carried in general alignment in support sections 90a–e) for the outer part of a belt, and the inner part of the belt is passed through the mold 92. A drive (not shown) is provided for the rollers to move the belts. A creased and curved paper or other suitable liner 96 is supplied to line the bottom portion of the conveyor belts, and side papers 97 (only one shown) may also be provided. A reactive mixture from a mixer 98 is deposited onto the paper 96 for reaction and forming within the tunnel.

Figure 10:
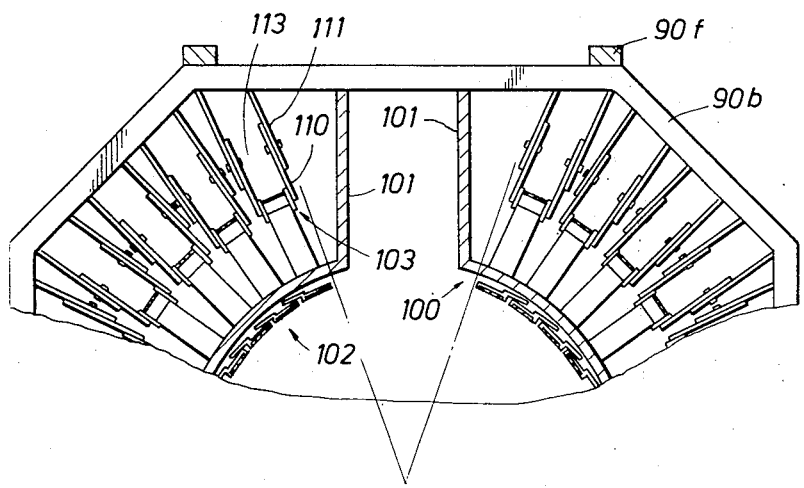
FIG. 10 is a view taken along line 10—10 of FIG. 9.

The foregoing generally described apparatus is intended for smaller size products and has versatility for selectively altering the cross-sectional configuration. As shown in FIG. 10, a typical frame 90b includes a cylindrically shaped ring member 100 with parallel, spaced-apart upright portions 101 coupling the ring member 100 to the frame 90b. The ring member 100 is braced longitudinally as necessary to provide a rigid support. Received within the ring member are a plurality of longitudinally overlapping plates 102 which have grooves or recesses for guiding belts and are bolted to one another to form a rigid cylindrical configuration which extends around the ring member and terminates short of the opening between the uprights 101. As shown in FIG. 10, the belts are also guided by grooved rollers 103 supported on frame 90b.

Figure 11:
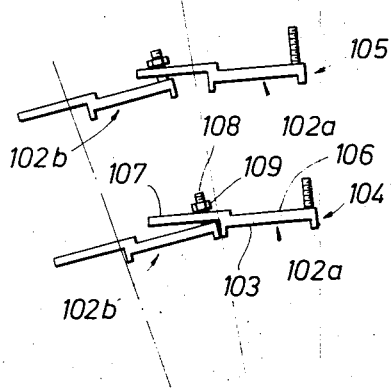
FIG. 11 is a schematic illustration of a different configuration for the apparatus of FIG. 10.

Referring now to FIG. 11, typical longitudinal plates 102a and 102b are illustrated in two radial positions 104 and 105. Each plate typically has a lengthwise extending recess 103 in a body 106. A lengthwise extending plate 107 attached to body 106 is arranged to overlap an adjacent body 102b. A threaded bolt 108 on body 101b passes through a transverse slot opening, and a nut 109 is used to fasten adjacent plates to one another. As shown in position 104, the plates 102a and 102b can be fixed closely adjacent to one another. While in position 105, the plates 102a and 102b are spaced from one another. While not shown, shims or the like can be used to compensate for the annular displacement between a plate and a body.

Figure 12:
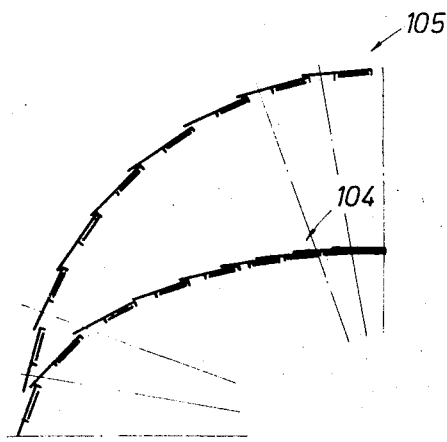
FIG. 12 is a partial cross-section view of a detail of the apparatus of FIG. 10.

The foregoing overlapping arrangement has the unique feature of permitting the curvature of the tunnel wall to be altered for different curvatures. As shown in FIG. 12, by adjusting the plates and refastening them, an elliptical shape can be obtained. Similarly, lengthwise of the tunnel the rearward portion can be opened to a greater cross-section than the forward end. To accommodate the belts, the rollers 103, as shown in FIG. 10, can be mounted on spaced-apart guides 110 which are longitudinally movable with respect to guides 111 and fastened with respect thereto by one or more bolt means 113.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Apparatus for use in the production of elongated elements of foamed cellular material from a liquid reaction mixture, said apparatus comprising:

means defining an elongated molding channel having a preselected curvilinear cross-sectional configuration and having a plurality of aligned longitudinal recesses circumferentially located about the surface of said channel, and conveyor means comprised of a plurality of endless belts each disposed in one of said recesses encircling and extending lengthwise of said channel in side-by-side relationship and having widths functionally related to the degree of curvature of said channel.

2. The apparatus of claim wherein adjacent edges of said belts are in close proximity to one another. claim 1

3. The apparatus of claim 1 and further including means for driving said belts at the same surface speed.

4. The apparatus of claims 1 wherein one of said recesses and belts has a different width than another of said recesses and said belts.

5. The apparatus of claim 1 wherein means are provided for guiding said belts relative to said channel.

6. The apparatus of claim 5 wherein said belts have different widths and said guiding means have corresponding spacings.

7. The apparatus of claim 1 and further including means for supplying a flexible liner for said channel, and means for depositing a liquid reaction mixture on said flexible liner.

8. The apparatus of claim 7 wherein said channel is open at its upper end.

9. Apparatus for use in the production of elongated elements of foamed cellular material from a liquid reaction mixture comprising:
means defining an elongated molding channel having flat and curvilinear configurations in cross section,
conveyor means comprised of a plurality of endless belts enclosing said channel and extending lengthwise of said channel in side-by-side relationship, said belts having a rectangular cross-section and lying on said flat and curvilinear configurations, said belts on said curvilinear having widths functionally related to the degree of said curvature, and
means on said curvilinear configuration for guiding said belts.

10. Apparatus for use in the production of elongated elements of foamed cellular material from a liquid reaction mixture, said apparatus comprising:
means defining an elongated molding channel including a given curvilinear cross-sectional configuration,
conveyor means comprised of a plurality of endless belts encircling said channel and extending lengthwise of said channel in side-by-side relationship,
recesses in said channel means for receiving said belts, and
means for driving said belts at a common surface speed.

11. Apparatus for use in the production of elongated elements of foamed cellular material from a liquid reaction mixture, said apparatus comprising:
means defining an elongated molding channel including a given curvilinear cross-sectional configuration,
conveyor means comprised of a plurality of endless belts encircling said channel and extending lengthwise of said channel in a side-by-side relationship, and
means for selectively adjusting the cross-sectional position of said belts and said molding channel for altering said cross-sectional configuration.

12. The apparatus of claim 11 wherein said channel includes lengthwise extending recesses for guiding said belts.

* * * * *